Patented Sept. 1, 1931

1,821,040

UNITED STATES PATENT OFFICE

HEINRICH TESCHE AND ALBERT JOB, OF ELBERFELD, NEAR COLOGNE, GERMANY, ASSIGNORS TO GENERAL ANILINE WORKS, INC., OF NEW YORK, N. Y., A CORPORATION OF DELAWARE

NEW NITROARYLAMINOANTHRAQUINONE COMPOUND

No Drawing. Application filed October 12, 1925, Serial No. 62,154, and in Germany November 6, 1924.

We have found new and useful improvements in nitroarylaminoanthraquinones of which the following is a clear and exact specification.

Our invention relates to a process of producing new nitroarylaminoanthraquinones in which the nitro group is attached to the aryl radicle.

In U. S. Patent No. 1,643,428 of September 27, 1927, application Serial No. 62,155 filed October 12, 1925, we have described new N-nitrosoarylamino anthraquinones of the general formula—

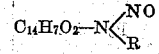

in which R is an aryl radicle; these nitrosamines are obtained by acting with nitrous acid compounds at temperatures below about 40° C. upon arylaminoanthraquinones.

We have now found that if these N-nitrosoarylaminoanthraquinones are heated to temperatures of say above 70° C. in solution of an organic acid the nitroso group separates from the amine nitrogen and with simultaneous oxidation a nitro group enters the aryl radicle. The yield of this reaction can be considerably improved and brought up to practically a theoretical yield if a nitrous acid compound such as an alkali metal nitrite, amyl nitrite, etc., is added to the reaction mixture.

Though in certain cases it might be of advantage to start from isolated pure N-nitroso-aryl-amino-anthraquinones, this is not generally necessary. The nitrosation of arylaminoanthraquinones as described in U. S. Patent No. 1,643,428 mentioned above is exceedingly smooth and quantitative. It is therefore quite practical to conduct the reaction so as to produce first the N-nitrosoaryl-amino-anthraquinones by moderately heating the aryl-amino-anthraquinones in solution of an organic acid with the requisite amount of a nitrous acid compound, then without isolating the nitrosamine increasing the temperature, and adding a further quantity of nitrous acid compound. The nitro-aryl-amino-anthraquinone is usually difficultly soluble in the organic acid. It separates from the reaction mixture and is isolated by filtering off. It is also possible to react with the nitrous acid compound upon the arylaminoanthraquinone compound in the presence of an organic acid directly at temperatures exceeding those at which the nitroso compounds can be isolated, that means at temperatures exceeding 70° C., whereby the nitroarylaminoanthraquinones are obtainable in just as good a yield as in the case that firstly moderate temperatures are applied, the nitroso compounds, which are likewise formed as intermediate products in this case, being converted into the nitro compounds in the nascent state.

This novel reaction proceeds as well with alpha as with beta-, with mono-, di-, or polyaryl-amino-anthraquinones and the anthraquinone nucleus can be further substituted in any desired manner. The nitroarylaminoanthraquinones have most probably the general formula—

They are deeply colored, crystalline substances, soluble in pyridine with colors similar to those of the solid product. They dissolve in sulfuric acid, sulfuric-boric acid and sulfuric acid to which formaldehyde has been added with characteristic colors ranging from violet to blue, green, olive and brown.

In order to further illustrate our invention the following examples are given, the parts being by weight.

(1) 1 part 1-N-nitroso-p-toluidoanthraquinone is suspended in 20 parts glacial acetic acid and the mixture heated to the boiling point. The color of this solution turns dark and orange colored crystalline needles separate out. They are the nitro-1-p-toluidoanthraquinone having most probably the formula —

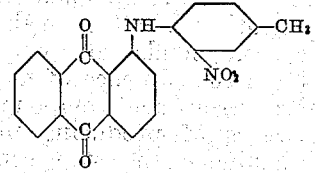

(2) 1 part 1-N-nitroso-p-toluidoanthraquinone is suspended in glacial acetic acid, sodium nitrite added and the mixture heated to the boiling point. The color of the solution turns dark and the orange colored nitro-1-p-toluidoanthraquinone separates into a practically quantitative yield. The product is identical with that obtained in Example 1. Sodium nitrite can be replaced in this reaction by amyl nitrite, etc.

(3) 1 part 1-p-toluidoanthraquinone is dissolved in 10–20 parts boiling glacial acetic acid and slowly at that temperature sodium nitrite added. The reaction is complete in a few minutes and the orange colored nitro-1-p-toluidoanthraquinone, identical with the product of Example 1, separates out.

(4) 1 part 1-4-di-p-toluidoanthraquinone is dissolved in 30 parts boiling glacial acetic acid and sodium nitrite added until the crystallization of the bluish-black needles of the dinitro-1-4-di-p-toluidoanthraquinone is complete. The product is filtered off and isolated in the usual manner.

The appearance and color reactions of some of our novel nitro-arylaminoanthraquinones are described in the following table.

*Color in—*

| Product | Sulfuric acid | Sulfuric-boric acid | Sulfuric acid & formaldehyde | Pyridine | Appearance |
|---|---|---|---|---|---|
| Nitro-1-p-toluido-anthraquinone. | Green. | Bluish-violet at slightly higher temperature. | Dark corn-flower blue. | Yellowish-red. | Orange-red needles. |
| Nitro-1-anilido-anthraquinone. | Yellowish-green. | Violet at slightly higher temperature. | Dark corn-flower blue. | Orange. | Orange-brown needles. |
| Nitro-2-p-toluido-anthraquinone. | Blue. | Blue. | Bluish-violet. | Golden yellow. | Orange crystals. |
| Nitro-2-anilido-anthraquinone. | Sky blue. | Blue. | Nearly colorless. | Golden yellow. | Orange crystals. |
| Dinitro-1-5-di-p-toluido-anthraquinone. | Weak dull violet. | Sky blue. | Dark bluish green. | Raspberry red. | Dark reddish-brown needles. |
| Dinitro-1-4-di-p-toluido-anthraquinone. | Dull bluish-green. | Blue at slightly higher temperature. | Dull bluish-green. | Olive-grey, red in thick layers. | Bluish-black needles. |
| Nitro-4-p-toluido-n-methyl-anthra-pyridon. | Brilliant reddish-violet. | Brown-red with a weak olive fluorescence. | Reddish-violet. | Clear-bluish-red. | Red crystals. |
| Nitro-5-p-toluido-1-hydroxy-anthraquinone. | Yellowish-olive. | Blue. | Blue. | Brownish-orange. | Dark brown crystals. |

We claim:—

1. In processes of producing nitroarylaminoanthraquinone compounds the step comprising heating N-nitrosoarylaminoanthraquinone compounds at temperatures above 70° C. in the presence of an organic acid.

2. In processes of producing nitroarylaminoanthraquinone compounds the step comprising heating N-nitrosoarylaminoanthraquinone compounds at temperatures above 70° C. in the presence of an organic acid and of a nitrous acid compound.

3. In processes of producing nitro-1-p-toluidoanthraquinone the step comprising heating N-nitroso-1-p-toluidoanthraquinone at temperatures above 70° C. in the presence of an organic acid.

4. In processes of producing nitro-1-p-toluidoanthraquinone the step comprising heating N-nitroso-1-p-toluidoanthraquinone at temperatures above 70° C. in the presence of an organic acid and of a nitrite compound.

5. In processes of producing nitro-1-p-toluidoanthraquinone the step comprising heating to boiling temperature N-nitroso-1-p-toluidoanthraquinone in glacial acetic acid.

6. In processes of producing nitro-1-p-toluidoanthraquinone the step comprising heating to boiling temperature N-nitroso-1-p-toluidoanthraquinone in glacial acetic acid in the presence of an alkali metal nitrite.

7. In the process of producing nitroarylaminoanthraquinone compounds, the steps which comprise reacting with a nitrous acid compound, at a temperature below about 40° C., upon an arylaminoanthraquinone compound dissolved in an organic acid, and then heating this solution at a temperature above 70° C.

8. In the process of producing nitroarylaminoanthraquinone compounds, the steps which comprise reacting with a nitrous acid compound, at a temperature below about 40° C., upon an arylaminoanthraquinone compound dissolved in an organic acid, and then heating this solution at a temperature above 70° C. while adding a further quantity of a nitrous acid compound.

9. In the process of producing nitro-1-p-toluidoanthraquinone, the steps which comprise reacting with a nitrous acid compound, at a temperature below about 40° C., upon 1-p-toluidoanthraquinone dissolved in an organic acid, and then heating this solution at a temperature above 70° C.

10. In the process of producing nitro-1-p-toluidoanthraquinone, the steps which comprise reacting with a nitrous acid compound, at a temperature below about 40° C., upon 1-p-toluidoanthraquinone dissolved in an organic acid, and then heating this solution at a temperature above 70° C. while adding a further quantity of a nitrous acid compound.

11. In the process of producing nitro-1-p-toluidoanthraquinone, the steps which comprise reacting with an alkali metal nitrite, at a temperature below about 40° C., upon 1-p-toluidoanthraquinone dissolved in glacial acetic acid, and then heating this solution to boiling temperature while adding a further quantity of an alkali metal nitrite.

In testimony whereof we have hereunto set our hands.

HEINRICH TESCHE.
ALBERT JOB.